United States Patent [19]

McDonald et al.

[11] Patent Number: 6,122,271

[45] Date of Patent: Sep. 19, 2000

[54] DIGITAL COMMUNICATION SYSTEM WITH INTEGRAL MESSAGING AND METHOD THEREFOR

[75] Inventors: Oliver F. McDonald, Pembroke Pines; Chin Pan Wong, Fort Lauderdale, both of Fla.

[73] Assignee: Motorola, Inc., Schaumburg, Ill.

[21] Appl. No.: 08/888,552

[22] Filed: Jul. 7, 1997

[51] Int. Cl.[7] .................................................. H04J 3/00
[52] U.S. Cl. .......................................... 370/345; 455/512
[58] Field of Search ................................ 370/345, 347, 370/348, 321, 322, 336, 337, 442, 394; 375/216, 298, 300; 379/88, 93.08; 455/45, 512, 513, 553, 511, 517, 85, 95, 108, 118, 161.2, 164.2, 183.2; 704/200, 208, 215, 233

[56] References Cited

U.S. PATENT DOCUMENTS

| | | | |
|---|---|---|---|
| 5,241,545 | 8/1993 | Kazecki et al. | 370/337 |
| 5,287,555 | 2/1994 | Wilson et al. | 455/126 |
| 5,357,595 | 10/1994 | Sudoh et al. | 704/215 |
| 5,519,640 | 5/1996 | Ganesan et al. | 395/200.66 |
| 5,525,992 | 6/1996 | Froschermeier | 340/825.34 |
| 5,546,394 | 8/1996 | Eaton et al. | 370/79 |
| 5,546,395 | 8/1996 | Sharma et al. | 370/468 |
| 5,550,893 | 8/1996 | Heidari | 375/216 |
| 5,596,318 | 1/1997 | Mitchell | 340/825.44 |
| 5,604,921 | 2/1997 | Alanara | 455/45 |
| 5,611,018 | 3/1997 | Tanaka et al. | 704/215 |
| 5,633,982 | 5/1997 | Ganesan et al. | 704/233 |
| 5,659,569 | 8/1997 | Padovanit et al. | 370/479 |
| 5,699,404 | 12/1997 | Satyamurti et al. | 340/311.1 |
| 5,778,026 | 7/1998 | Zak | 455/127 |
| 5,790,527 | 8/1998 | Janky et al. | 370/321 |
| 5,867,567 | 2/1999 | Itoh | 379/142 |
| 5,873,058 | 2/1999 | Yajima et al. | 704/201 |
| 5,884,250 | 3/1999 | Ono et al. | 704/201 |
| 5,974,374 | 10/1999 | Wake | 704/215 |

*Primary Examiner*—Dang Ton
*Assistant Examiner*—Phirin Sam
*Attorney, Agent, or Firm*—Scott M. Garrett

[57] ABSTRACT

A digital communications system (10) includes a transmitting apparatus (12) and a receiving apparatus (14). In addition to a primary information signal (16), messages and control signals (24) are communicated for use by the equipment. To avoid the use of dedicated frequency spectrum, control channel time slots, or the degradation of forward error correction of the encoded information signal, the transmitting apparatus determines the occurrence of a silence period (28) in the information signal, then inserts the message or control signal information into the silence period. The resulting composite signal is transmitted to the receiving apparatus where message and control information is removed for use by the receiving equipment, leaving the information signal intact.

3 Claims, 5 Drawing Sheets

DIGITAL COMMUNICATION SYSTEM WITH INTEGRAL MESSAGING AND METHOD THEREFOR

TECHNICAL FIELD

This invention relates in general to communications systems, and particularly to digital communications systems where control signals are communicated along with a primary information signal.

BACKGROUND

In communications systems it is always the goal to receive a signal in much the same form as it was transmitted. Noise and interference in a given communications channel work against that goal. With the advent of digital technology, tools such as forward error correction, error detection, and information compression allow communications over channel that might otherwise be considered too noisy for quality analog communications to take place. Another of the many benefits of digital communications is that messaging between communicating equipment can take place in many ways. That is, as one device communicates with another, information about signal quality, signal energy level, and timing, among other parameters, can be communicated between the devices to ensure a robust link. This messaging can take place without affecting the perceived signal quality.

There are several ways in which messaging can take place between communications equipment. A first method is to dedicate a separate frequency channel for messaging. This assumes that additional frequency spectrum is available, which is not always the case. A second method is to dedicate a time slot in a framed digital signal, or using a portion of the header of a digital signal frame for messaging. This so called common signaling channel (CSC) is in widespread use in telephony, particularly in digital switch interface protocols. CSC still has the advantage of not disturbing the information contained in the primary signal, and also does not require additional spectrum. However, CSC reduces the available bandwidth allocated to the primary information signal since some is siphoned off for the messaging component. Another method of signaling is the use of so called bit-robbing or bit-stealing methods. In bit-robbed messaging, the primary information signal is altered according to some prescribed format. A popular format in telephony is to use two bits of every nth, typically sixth, data byte sent for signaling. For $\mu 255$ pulse code modulation (PCM) digital telephony signals, where the least significant bit of every 6th PCM code word is used for signaling, bit robbing implies that the effective number of bits per sample is 7 and 5/6 bits instead of eight. So, in such a signaling format, bit robbing essentially trades signal integrity for a slightly smaller frame width.

However, by employing forward error correcting codes, the effect of bit robbing can be significantly reduced. Assuming that the hamming distance between code words is at least 2, then using one bit of the code word still leaves some correction ability. Of course, the code word must be received without any further corruption. Unfortunately, conditions may be such that further corruption in the received signal is unavoidable.

In many communications systems, and particularly in wireless systems such as digital cellular, as a signal weakens between a communicating devices, the amount of messaging between the devices will typically increase. This is done for reasons such as ensuring the quality of the link and to initiate handoff between cells. At the same time, given that the signals are weaker, they are susceptible to noise and interfering signals. This is the case when, for example, a cellular phone is at the edge of serving cell, especially if it is a boundary cell of the region. In which case, if messaging is done through a bit robbing scheme, the error correction may be compromised to a point where errors are unrecoverable because of the additive effect of bit robbing and errors resulting from noise and interference. However, in some cases, the information would be recoverable if either the messaging or the noise/interference were not present.

At the same time, more complex systems, such as digital cellular telephone systems, have much more sophisticated signaling protocols. In general, any control signal passed from one device to another is referred to as a message. These types of systems send messages regarding, for example, hand-off between cells, subscriber identification numbers, and signal level measurements, to name but a few. These messages may become quite long, and may exceed several hundred bits in length. It is important that such messages are received intact. If the simple scheme of bit robbing is employed, the messages, in effect, would not have any type of forward error correction.

Therefore, it would be preferable to avoid the intentional compromise of error correction by bit-robbed messaging, and instead perform messaging in an alternative way. Thus, there is a need, in a digital communications system, for a means by which to send messages between communicating devices without performing bit-robbing, and without using a dedicated messaging channel in either a dedicated frequency or a dedicated time slot, and which would allow the message data to be coded for error correction.

DETAILED DESCRIPTION OF THE PREFERRED EMBODIMENT

Figure 1:
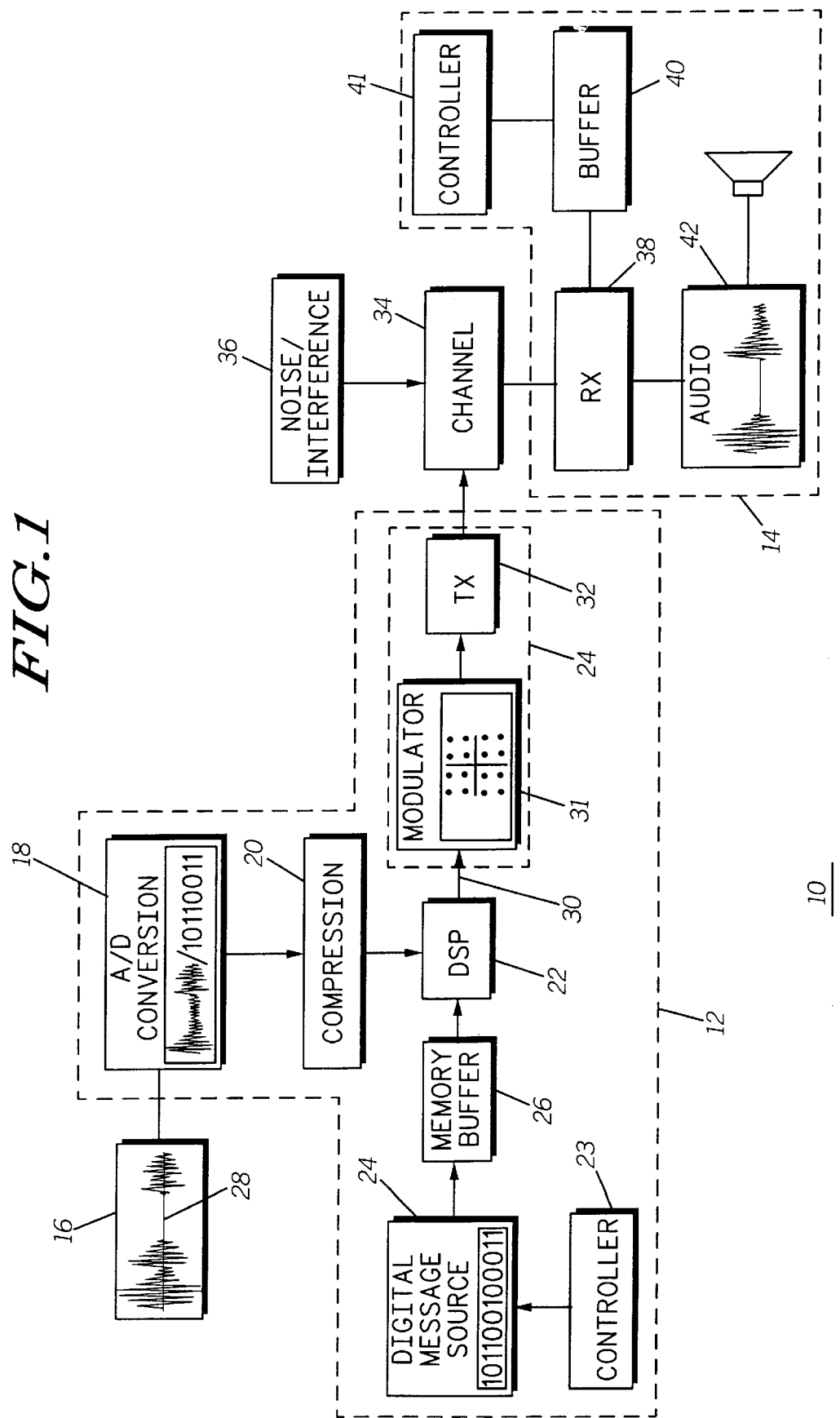
FIG. 1 is a block diagram illustration of a digital communications system in accordance with the invention.

While the specification concludes with claims defining the features of the invention that are regarded as novel, it is believed that the invention will be better understood from a consideration of the following description in conjunction with the drawing figures, in which like reference numerals are carried forward.

The instant invention takes advantage of the fact that, in many signals there are occurrences of periods of little or no information. Such periods are referred to herein as silence periods. One type of signal that is particularly suited to the invention is a speech or voice signal, as is found in telephony, for example. It is well known that, in such signals, on average, a majority of the signal is silence, or periods of little information. Some references indicate that as much as 63% of speech is of such low information content that it could be considered silence. Speech sounds are typically grouped into one of three classes; plosive sounds, fricative sounds, and vocal sounds. Unvoiced fricative sounds typically have little information content, and may be seen as silence or noise information in some circumstances. The instant invention takes advantage of these periods of little information to conduct messaging between communicating equipment, and in some cases would consider unvoiced fricative speech as the occurrence of a silence period because of the low information content.

Referring now to FIG. 1, there is illustrated therein a block diagram of a digital communications system 10 in accordance with the invention. In general there is a transmitting apparatus 12 and a receiving apparatus 14. The transmitting apparatus 12 processes an information signal 16, such as a voice signal. The information signal typically is originally in analog and is converted to digital form by an analog to digital converter 18. When the information signal begins as analog, the analog to digital converter block comprises transducer circuitry, such as a microphone, for converting the original signal to an electrical analog signal, which is in turn converted to a digital form. Often, after digitizing the information signal, it is processed to achieve data compression. In cases where the information signal 16 is a voice signal, the information compression can be performed by a vocoder, as is known in the art. The vocoder takes the raw digital data and converts it to digital symbols corresponding to speech pattern characteristics. The compressed signal is sent to a digital signal processor 22, which prepares the data for transmission.

Whenever a control signal needs to be sent, the transmitting apparatus controller 23 generates a digital message 24, which is latched in a memory device or buffer 26. Concurrently, the digital signal processor 22 processes the data derived from the information signal. The digital signal processor performs several functions, such as, for example, coding the data for forward error correction and formatting the data for transmission. In the present invention, the digital signal processor evaluates the data from the information signal, and provides a means for detecting the occurrence of a silence period 28. The silence period may simply be a brief pause in a speech signal, or another part of speech, such as an unvoiced fricative, having a low information content. In non-speech signals, such as telemetry, there may be periods where no data is transmitted, or the same binary digit, 1 or 0, is sent for a short time. These periods may also be considered silence periods. In other words, a silence period is a period during which no significant information is present in the primary information signal.

If the information signal is a voice signal, identification of a silence period may be done by any of the well known means in the art, such as, for example, cepstrum analysis. In general, the digital signal processor provides a means for measuring an energy level of the information signal on a frame by frame basis. Additional methods may be employed if a more precise analysis is desired. If the information signal is not a voice signal, other methods may be employed. For example, if the information signal is a computer data stream, there will be likely be sections containing all zeroes, which could be designated as a silence period.

Once the digital signal processor 22 identifies a silence period, as determined by examining the speech frames, the contents of the messaging buffer or buffers are examined. If a message is queued, the digital signal processor fills the speech frame with the messaging information. In a practical embodiment, the header of the frame would indicate that messaging is the frame payload instead of the information signal. Thus, the digital signal processor provides a means for inserting the control signal into the information signal during the silence period, providing a composite signal on line 30. This composite signal is fed to a means for transmitting 29, which comprises a modulator 31 and transmitter 32. The modulator is a digital modulator, and so modulates a carrier according to a digital modulation format, such as phase shift keying, frequency shift keying, and quadrature amplitude modulation (QAM), to name a few. In the preferred embodiment, the modulator 31 is a QAM type modulator, and the transmitter 32 is a radio frequency (RF) transmitter. The transmitter transmits the modulated carrier through a channel 34, into which noise and interference 36 may also be added. In the preferred embodiment, the channel 34 is a wireless channel, and the transmitter is a wireless RF transmitter, although it is conceived that the channel may be a wired or guided wave channel, such as, for example, a community antenna television (CATV) network.

The receiving apparatus 14 picks up the modulated carrier from the channel through a receiver 38. The receiver demodulates and decodes the signal, and checks each frame to see if it contains messaging information. If messaging information is present, the data of that frame is routed to a control signal buffer 40 where it is accessed by the receiving apparatus controller 41 as needed. If the frame does not contain messaging or control information, it is processed normally. The result is that a reproduction of the information signal 42 is achieved, and control signals are extracted from the silence period or periods. In the preferred embodiment, when silence periods occur but there is no control information pending in the transmitting apparatus, the transmitter is shut down so as to conserve power in a battery powered mobile unit. In which case the receiver plays a silence signal, or comfort noise as it may be referred to in the art.

Figure 2:
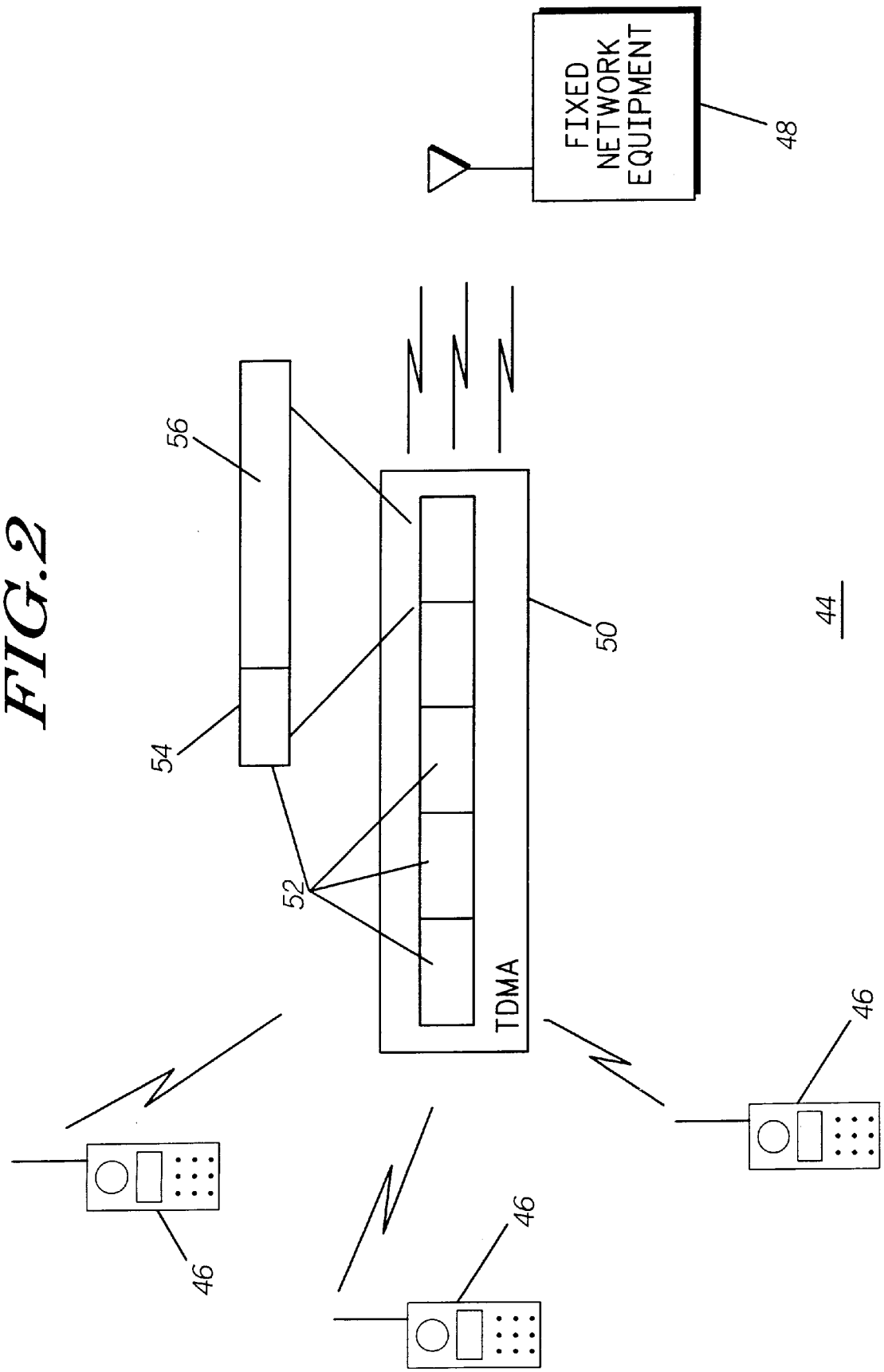
FIG. 2 is an illustration of a communications system having a plurality of mobile subscriber units in accordance with one embodiment of the invention.

Referring now to FIG. 2, there is illustrated therein a communications system 44 having a plurality of mobile subscriber units 46 operating in accordance with one embodiment of the invention. The subscriber units communicate with a fixed network equipment (FNE) 48 over a wireless time division-multiple access (TDMA) channel 50. Each mobile subscriber unit is assigned to a unique time slot 52 in the channel after registering with the FNE, and transmits only during it's assigned time slot. Each time slot generally has a header 54 and a payload 56. The header is used for, among other things, indicating what type of information is carried in the payload. The payload is a portion of a data stream derived from the primary information signal, and is typically encoded data, such as voice signal or control signal data.

Figure 3:
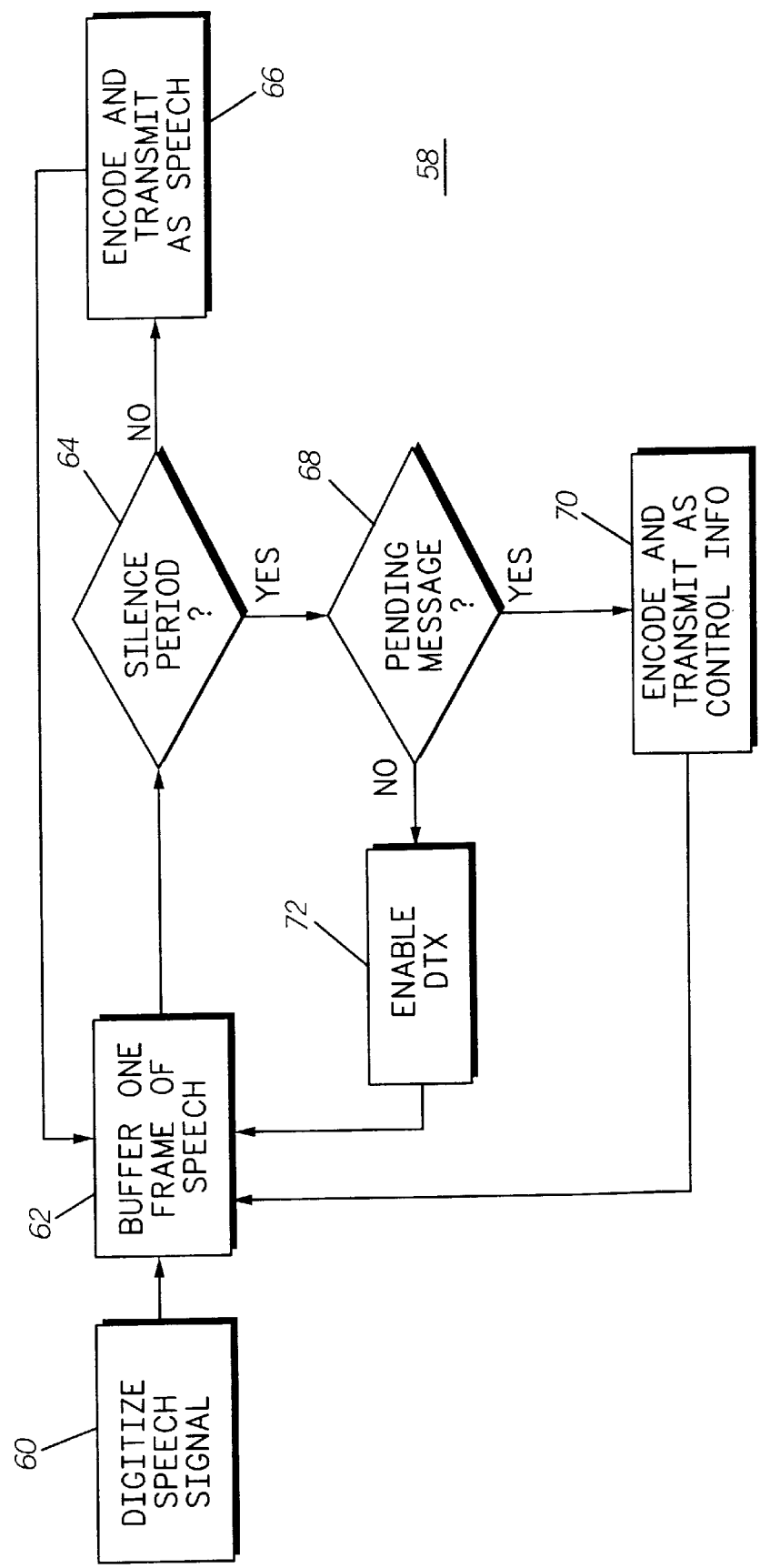
FIG. 3 is a flow chart diagram illustration of a communications process in accordance with the invention.

Referring now to FIG. 3, there is illustrated therein a flow chart diagram 58 of a process in accordance with the invention. First, the step of digitizing the information signal 60 must be performed. For this example the information signal is a voice signal, and thus it is speech that is being digitized and processed according to the invention. The speech signal is divided into frames which are buffered 62 after digitization in a memory element, as is known in the art. In the preferred embodiment, the frame width is selected suitably small so that at least one frame will fit within a typical silence period, as determined by the particular application. Each frame is analyzed 64 to determine if the frame occurs during a silence period. If, according to this example, speech information is present, the digital data is processed normally 66 by encoding and transmitting the data as speech. This means that the digital signal processor of FIG. 1 would enter the necessary digits into the header of the transmitted frame indicating that speech information is present in the payload.

Should the digital signal processor determine, during analysis 64, that the frame has occurred during a silence period, the transmitting apparatus then checks to see if there is a pending message 68. If a message or control signal is present, then the payload of the next frame to be transmitted is filled with the message data, after encoding, the header set to indicate such, and then the frame is transmitted 70. If no message is pending, then, in the preferred embodiment, to conserve battery power, the transmitter is shut down 72. This is referred to in the art as disabling the transmitter (DTX).

In a given communications system where the invention is to be utilized, it is likely that the messages sent during silence periods are longer than a single frame. In such cases, the message is sent in consecutive frames occurring during the silence period, and concatenated at the receiver to obtain the full message.

Figure 4:
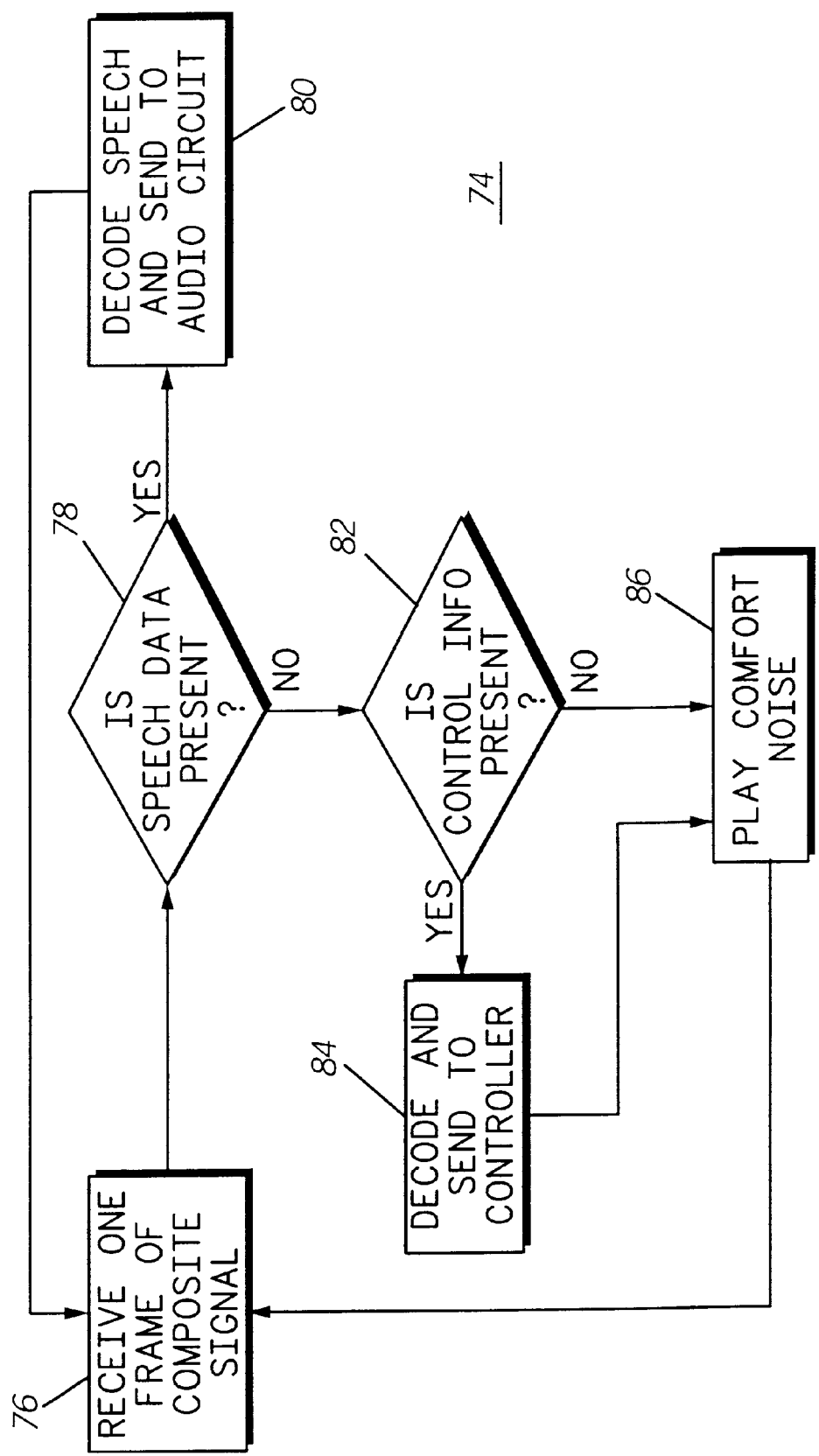
FIG. 4 is a flow chart diagram of a process for use in a receiving equipment in accordance with the invention.

The receiving equipment follows a procedure to extract messages from the received composite signal. Referring now to FIG. 4, there is illustrated therein a flow chart diagram 74 of a process for use in a receiving equipment in accordance with the invention. The receiving equipment receives a frame of the composite signal 76. In the preferred embodiment, the receiver will receive the signal via an over-the-air radio link, in a time division format. The receiver 38 of FIG. 1 demodulates and decodes the digital signal, placing each frame in a buffer so that it may be processed. The next step is to determine if the received frame contains speech or message data 78. If speech data is present, it is sent to a decoder 80 which decodes the error correction to arrive at the raw data, which is subsequently sent to an audio circuit, according to this example. If in analyzing the incoming frame in 78 it is determined that speech data is not present, then the frame is checked for message, or control, information 82. If, in checking the frame header, message information is indicated, it is decoded 84 as such, and acted on by the receiving equipment. If, at steps 78 and 82 no recognized information is present, the frame is treated as silence, and comfort noise 86 is played by the audio circuit. By comfort noise it is meant that, instead of background noise, the audio circuit plays a low level silence simulation, giving the impression that there is incoming signal when there is none since the transmitting equipment does not transmit during silence unless there is messaging. The step of playing comfort noise 86 is also carried out when messaging is received since, according to the invention, messaging is sent during silence periods in the primary information signal.

Figure 5:
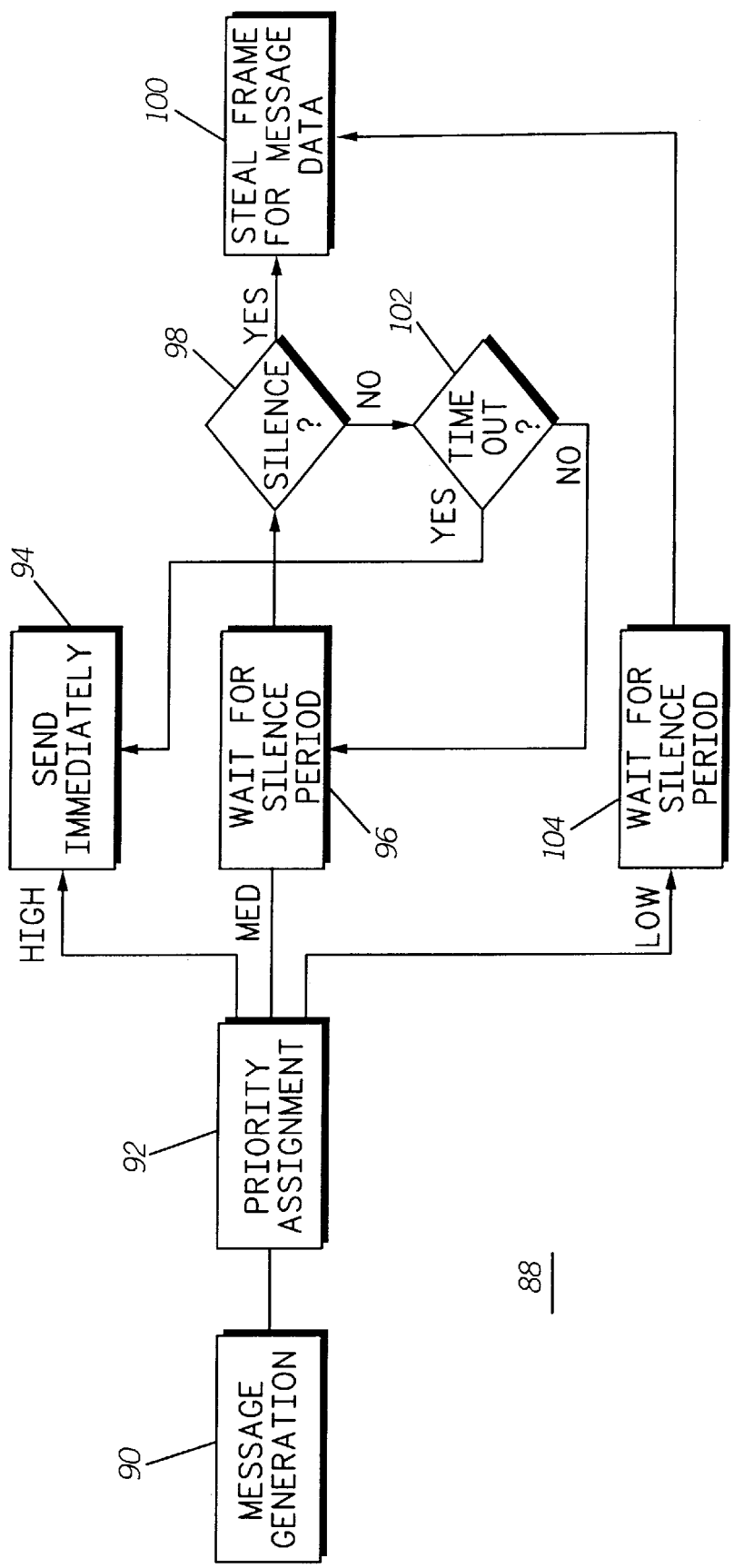
FIG. 5 is a flow chart diagram illustration of a process for use in a communications system in accordance with an alternative embodiment of the invention.

In an alternative embodiment, it is recognized that in some communications systems there are urgent messaging situations that may not necessarily be able to wait for a silence period to occur. FIG. 5 illustrates a flow chart diagram 88 of a process for use in a communications system in accordance with an alternative embodiment of the invention. First, a message is generated 90. Typically this occurs when the transmitting equipment's controller decides that some data must be sent, or according to the communications protocol. After generating the message, a priority is assigned 92. For this example, there are three priorities selected from the set consisting of high, medium, and low. However, it is contemplated that the priority scale may be partitioned further. In the transmitting apparatus, the step of assigning a priority level is performed by the transmitting apparatus controller 23 of FIG. 1. Messages clarified as high priority are messages that must be sent immediately by conventional techniques, such as bit-robbing of the encoded information signal data. Medium priority signals are those signals that can wait for the occurrence of a silence period, but only for a finite period of time. For medium priority signals, the transmitting equipment first waits 96, then checks the information signal frames to determine if a silence period has occurred 98. If a silence period has occurred, the frame is stolen 100 and used to transmit message data. If after the initial wait period, a silence frame has not occurred, a timer associated with the message is checked to see if it has timed out 102. If the message time out period has been reached, the message is sent immediately 94 since any further waiting may jeopardize communications. If the message timer has not reached the end of the message time out period, the transmitting equipment continues to wait 96. Finally, messages assigned a low priority are sent only upon the occurrence of a silence period 104, much as was discussed hereinabove in reference to FIG. 3.

The instant invention thus provides two chief advantages over prior methods of communicating control signals between equipment. First, the invention allows control signals to be communicated without the need of additional frequency spectrum, time allocation, or degradation of forward error correction. By avoiding bit-robbing methods, communications is made more robust since the error correction retains full integrity. Second, it allows the control or message data itself to be encoded for error correction. By taking advantage of silence periods in the primary information signal, equipment designed in accordance with the instant invention, the frames occurring during the silence period may be fully utilized to send control data, which may be encoded for error correction the same as the primary information signal.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of communicating a digital message, when the digital message is present, with a voice signal, comprising the steps of:

assigning a priority level to said digital message, said priority level selected from the set consisting of high, medium, and low;

digitizing said voice signal to provide a digital voice signal;

analyzing said digital voice signal to determine a silence period in said digital voice signal;

if said digital message is present, inserting said digital message into said digital voice signal according to said priority level, said priority level of high requiring said message to be inserted immediately, said priority level of medium requiring said message to be inserted upon either the occurrence of said silence period or a predetermined time period, said priority level of low requiring said digital message to be inserted only upon the occurrence of said silence period, said step of inserting providing a composite signal; and transmitting said composite signal.

2. A method of communicating the digital message as defined by claim 1, wherein said step of analyzing comprises measuring an energy level of said digital voice signal.

3. A method of communicating the digital message as defined by claim 2, wherein said step of transmitting comprises transmitting said composite signal in a time division format.

\* \* \* \* \*